(12) United States Patent
Seto (10) Patent No.: US 7,481,113 B2
(45) Date of Patent: Jan. 27, 2009

(54) SEMICONDUCTOR SENSOR WITH PROJECTION FOR PREVENTING PROOF MASS FROM STICKING TO COVER PLATE

(75) Inventor: Masami Seto, Osaka (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 11/489,135

(22) Filed: Jul. 18, 2006

(65) Prior Publication Data

US 2007/0022814 A1 Feb. 1, 2007

(30) Foreign Application Priority Data

Jul. 27, 2005 (JP) ............................. 2005-216998

(51) Int. Cl.
*G01P 15/12* (2006.01)
(52) U.S. Cl. ................................. 73/514.33; 73/514.38
(58) Field of Classification Search ............. 73/514.33, 73/514.34, 514.29, 514.16, 514.32
See application file for complete search history.

(56) References Cited

U.S. PATENT DOCUMENTS

| | | | | |
|---|---|---|---|---|
| 5,351,542 | A * | 10/1994 | Ichimura et al. | ......... 73/514.33 |
| 5,894,144 | A * | 4/1999 | Mori et al. | ................... 257/254 |
| 6,892,578 | B2 * | 5/2005 | Saitoh et al. | ............. 73/514.33 |
| 6,959,984 | B2 | 11/2005 | Ogura et al. | |
| 7,004,030 | B2 * | 2/2006 | Ikegami et al. | ........... 73/514.38 |
| 7,267,007 | B2 * | 9/2007 | Nakamura | ............... 73/514.33 |

FOREIGN PATENT DOCUMENTS

| | | |
|---|---|---|
| JP | 63-226074 | 9/1988 |
| JP | 3-7350 | 1/1991 |
| JP | 06-027136 | 2/1994 |
| JP | 6-183023 | 7/1994 |
| JP | 10-170542 * | 6/1998 |
| JP | 0924081 A2 | 6/1999 |
| JP | 11-240171 | 9/1999 |
| JP | 2002-273905 | 9/2002 |
| JP | 2003-1846 | 1/2003 |
| JP | 2003-191495 | 7/2003 |
| JP | 2004-61193 * | 2/2004 |
| JP | 2004-233072 | 8/2004 |
| JP | 2004-233080 | 8/2004 |
| JP | 2004-257832 | 9/2004 |

OTHER PUBLICATIONS

Jul. 4, 2008 Japanese official action in connection with corresponding Japanese application No. 2003-289943.

* cited by examiner

*Primary Examiner*—Helen C. Kwok
(74) *Attorney, Agent, or Firm*—Cooper & Dunham, LLP (57) ABSTRACT

A disclosed semiconductor sensor includes a proof-mass, a frame disposed around the proof-mass and including at least a silicon layer, a beam for supporting the proof-mass, the beam being disposed at a first surface side of the frame between the proof-mass and the frame, a piezoresistor disposed on the beam, a metal wiring pattern and a pad electrode formed on the first surface of the frame and electrically connected to the piezoresistor, a cover plate disposed above and spaced apart from the proof-mass and the beam at the first surface side of the frame and fixed to a cover plate fixing area disposed on the first surface of the frame, and a projection disposed on the proof-mass at the first surface side to prevent the proof-mass from sticking to the cover plate.

13 Claims, 11 Drawing Sheets

Prior Art

SEMICONDUCTOR SENSOR WITH PROJECTION FOR PREVENTING PROOF MASS FROM STICKING TO COVER PLATE

BACKGROUND

1. Technical Field

This disclosure relates to a semiconductor sensor using a piezoresistor such as a semiconductor acceleration sensor and a semiconductor angular velocity sensor.

2. Description of the Related Art

Semiconductor sensors are used for measuring, for example, acceleration applied to moving vehicles in the moving direction or the lateral direction, camera shake, and so forth.

Some semiconductor sensors include piezoresistors formed on the surfaces of single crystal silicon wafers using the same techniques and methods for fabricating ICs (integrated circuits) so as to use the piezoresistors as strain gauges (see, for example, Patent Documents 1, 2, and 3). In this type of semiconductor sensor using a piezoresistor, a piezoresistor is formed on one side of a silicon wafer, while a gap is formed in the other side of the silicon wafer by, e.g., etching so as to form a thin beam under the piezoresistor. With this configuration, as the resistance of the piezoresistor changes in response to bending of the beam, the semiconductor sensor can obtain electric signals corresponding to acceleration by measuring the resistance of the piezoresistor.

The semiconductor sensor is provided with a proof-mass so as to make the beam more easily flexed. The beam is fixed at one end to the proof-mass and at the other end to a frame surrounding the proof-mass. A metal wiring pattern and a pad electrode electrically connected to the piezoresistor are formed on the frame.

It has been proposed that a cover plate for limiting displacement of the proof-mass be disposed spaced apart from the proof-mass and the beam in order to prevent the beam from being damaged by a strong impact (see, for example, Patent Document 4).

In a semiconductor sensor disclosed in Patent Document 4, gaps for fixing a cover plate are provided in the surface of a frame. The cover plate is fixed by the gaps such that the cover plate is located above a proof-mass and a beam and limits displacement of the cover plate.

However, having such dedicated areas for fixing the cover plate in the frame results in increasing the chip area of the semiconductor sensor. To avoid an increase of the chip area of the semiconductor sensor, the cover plate may be bonded to the frame using epoxy adhesive. However, epoxy adhesive contracts with the heat of bonding and generates a residual stress, which adversely affects the sensitivity of the semiconductor sensor. Moreover, there are other problems with using epoxy adhesive, such as non-uniform application of epoxy adhesive and application of epoxy adhesive to unintended areas.

In an alternative method, glass frit bonding is used in place of adhesive. However, even if glass frit bonding is used, the problem of generation of residual stress due to heat contraction during bonding occurs.

This problem may be solved by bonding the cover plate to the frame by using anodic bonding.

Figure 7A:
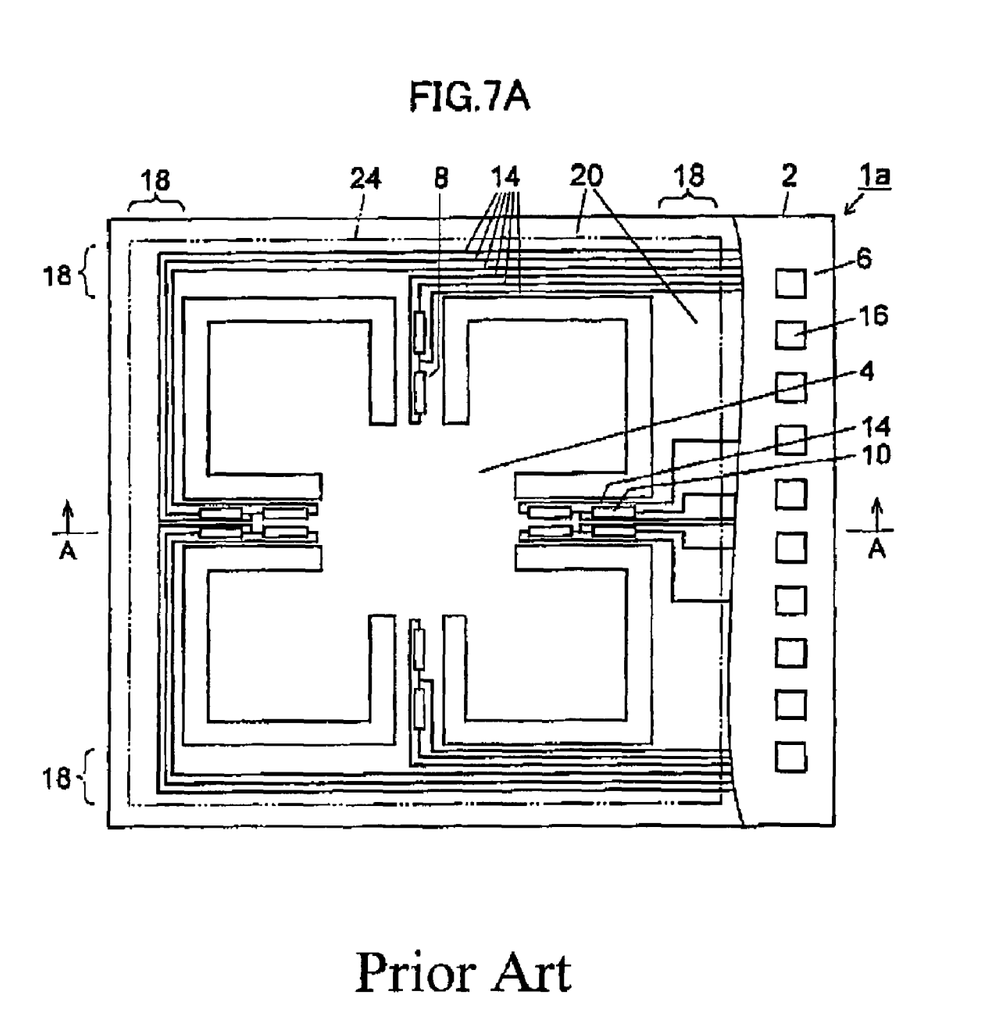
FIG. 7A is a plan view showing a related-art semiconductor sensor.
Figure 7B:
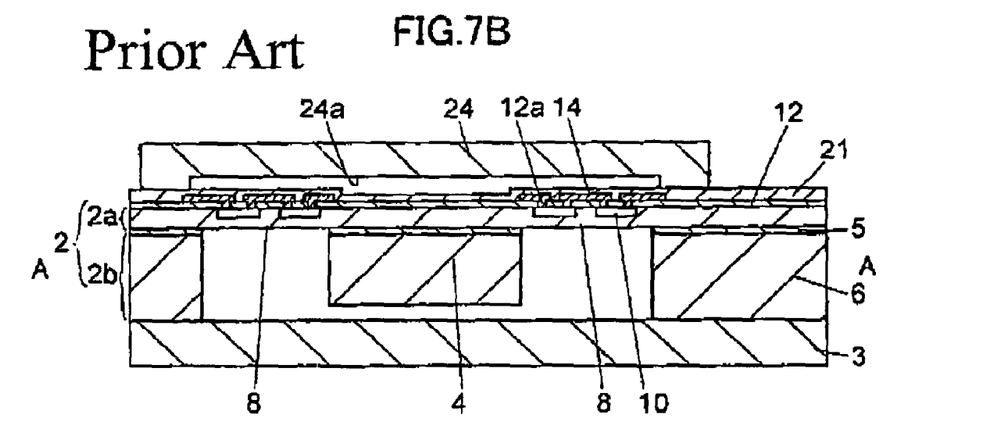
FIG. 7B is a cross-sectional view taken along line A-A of FIG. 7A.
Figure 7C:
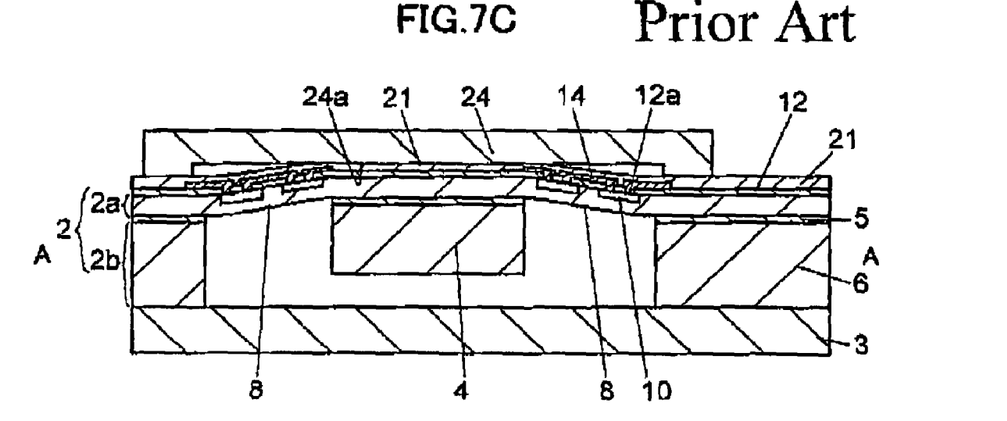
FIG. 7C is a cross-sectional view showing the related-art semiconductor sensor during anodic bonding.

FIG. 7A is a plan view showing an example of a related-art semiconductor sensor 1a. FIG. 7B is a cross-sectional view taken along line A-A of FIG. 7A. FIG. 7C is a cross-sectional view showing the semiconductor sensor during anodic bonding.

The semiconductor sensor 1a comprises a SOI (Silicon-on-Insulator) substrate 2 including a silicon layer 2a, an insulation layer 5 formed under the silicon layer 2a, and a silicon layer 2b formed under the insulation layer 5.

A frame-like frame 6 is formed of the SOI substrate 2. Beams 8 formed of the silicon layer 2a are provided to extend continuously from the upper surface side of the SOI substrate 2. Piezoresistors 10 are provided in the silicon layer 2a of the beams 8.

A proof-mass 4 is disposed spaced apart from the frame 6 in the center of the area surrounded by the frame 6. The proof-mass 4 is connected at the upper surface side to the beams 8 via the silicon layer 2a and is supported by the beams 8.

An insulation film 12 is formed on the upper surface of the SOI substrate 2. In FIG. 7A, the piezoresistor 10 are shown for explanation purposes. Plural metal wiring patterns 20 and plural pad electrodes 16 are formed on the insulation film 12, and are electrically connected to the piezoresistors 10 via the through holes 12a formed in the insulation film 12.

Although not shown in FIG. 7A, a protection film 21 is formed on the insulation film 12, covering the metal wiring patterns 20. Openings are formed in the protection film 21 on the pad electrodes 16 so as to expose the surfaces of the pad electrodes 16.

A glass substrate 3 is bonded to the lower surface of the frame 6 by anodic bonding. The lower surface of the proof-mass 4 is spaced apart from the glass substrate 3.

A cover plate fixing area 18 is provided at the periphery of the surface of the frame 6. A cover plate 24 made of a glass substrate is fixed to the cover plate fixing area 18 by anodic bonding. A gap 24a is formed in the center of the lower face thereof such that the bottom surface of the gap 24a is spaced apart from the proof-mass 4 and the beam 8.

<Patent Document 1> Japanese Patent No. 2670048

<Patent Document 2> Japanese Patent Laid-Open Publication No. 2004-233080

<Patent Document 3> Japanese Patent Laid-Open Publication No. 2004-257832

<Patent Document 4> Japanese Patent Laid-Open Publication No. 2004-233072

In the related-art semiconductor sensor 1a shown in FIGS. 7A-7C, the cover plate 24 is bonded, by anodic bonding, to the cover plate fixing area 18 provided on the frame 6. Anodic bonding is simpler than bonding using adhesive or glass frit bonding and provides stable bonding strength.

When fixing the cover plate 24 to the frame 6 by anodic bonding, electrostatic force is generated by a DC current applied during the bonding. Thus, the proof-mass 4 is attracted to the cover plate 24 by the generated electrostatic force and sticks to the bottom surface of the gap 24a (see FIG. 7C). Even if the bottom surface of the gap 24a of the cover plate 24 is roughened, sticking of the proof-mass 4 cannot be completely prevented.

Once the proof-mass 4 sticks to the cover plate 24 due to anodic bonding, the proof-mass 4 cannot be easily separated from the cover plate 24 even by applying an electric field of opposite bias to the bias for bonding or by removing the electrostatic force. Although the proof-mass 4 can be separated from the cover plate 24 with vibration energy using ultrasonic cleaning or fine-jet cleaning, these methods have a high risk of breaking the beams 8 and may reduce the production yield of the semiconductor sensor 1a.

The sticking of the proof-mass 4 to the cover plate 24 may be prevented by increasing the distance between the proof-mass 4 and the cover plate 24. However, in the case where the proof-mass 4 is attracted to the cover plate 24 by electrostatic force during bonding, the beams 8 might be broken.

The contact area between the proof-mass 4 and the cover plate 24 can be reduced by providing the gap 24a of the cover plate 24 with local depth variation. However, as a process for providing the local depth variation is required, the production cost of the semiconductor sensor 1a is increased.

BRIEF SUMMARY

This disclosure relates to a semiconductor sensor configured to prevent a proof-mass from sticking to a cover plate with electrostatic force during anodic bonding for attaching the cover plate to a frame, and to make the proof-mass be easily removable from the cover plate even if the proof-mass sticks to the cover plate.

According to one aspect of the present invention, there is provided a semiconductor sensor that comprises a proof-mass; a frame disposed around the proof-mass and including at least a silicon layer; a beam for supporting the proof-mass, the beam being disposed at a first surface side of the frame between the proof-mass and the frame; a piezoresistor disposed on the beam; a metal wiring pattern and a pad electrode formed at least on the first surface of the frame and electrically connected to the piezoresistor; a cover plate disposed above and spaced apart from the proof-mass and the beam at the first surface side of the frame and fixed to a cover plate fixing area disposed on the first surface of the frame; and a projection disposed on the proof-mass at the first surface side to prevent the proof-mass from sticking to the cover plate.

According to the study by the inventor of the present invention, it was found that when the distance between a proof-mass and a cover plate is less than 13 μm, the proof-mass is likely to stick to the cover plate by electrostatic force due to anodic bonding. If, on the other hand, the distance between the proof-mass and the cover plate is more than 19 μm, a beam is largely bent by electrostatic force or a strong impact due to anodic bonding.

In view of these findings, in one embodiment of the present invention, the distance between the proof-mass and the cover plate is in a range of 13 μm-17 μm. With this distance, the proof-mass is less likely to stick to the cover plate by electrostatic force generated when bonding the cover plate to a frame. Moreover, strain of a beam can be reduced to prevent the beam from being broken. Accordingly, a sensor with high impact resistance is provided.

DETAILED DESCRIPTION OF THE PREFERRED EMBODIMENT

Figure 1A:
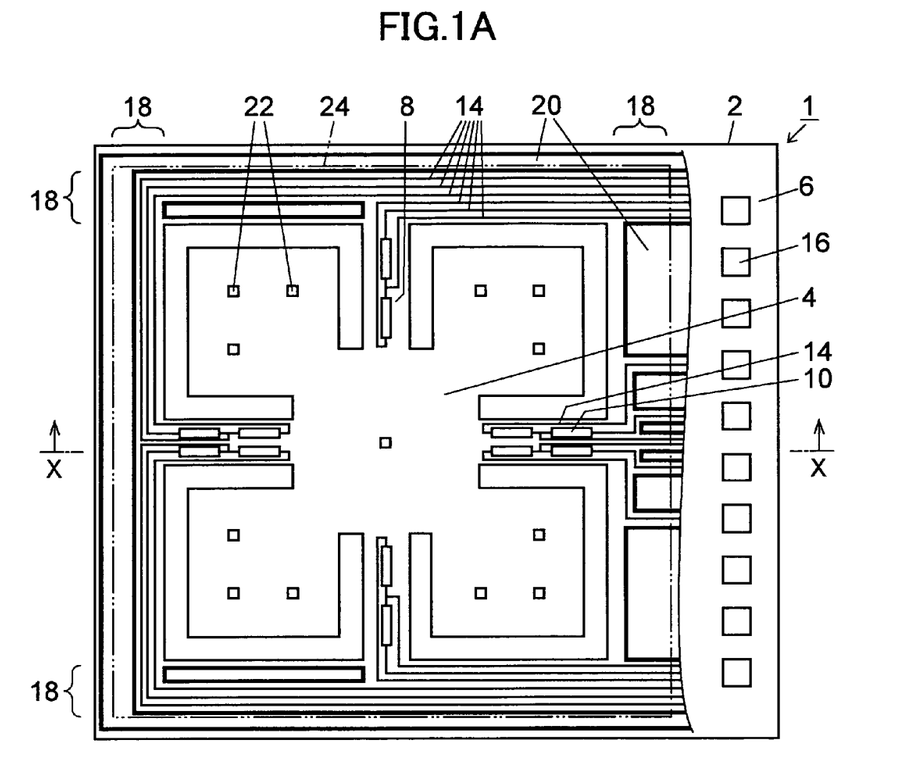
FIG. 1A is a plan view showing a semiconductor sensor according to an embodiment of the present invention.
Figure 1B:
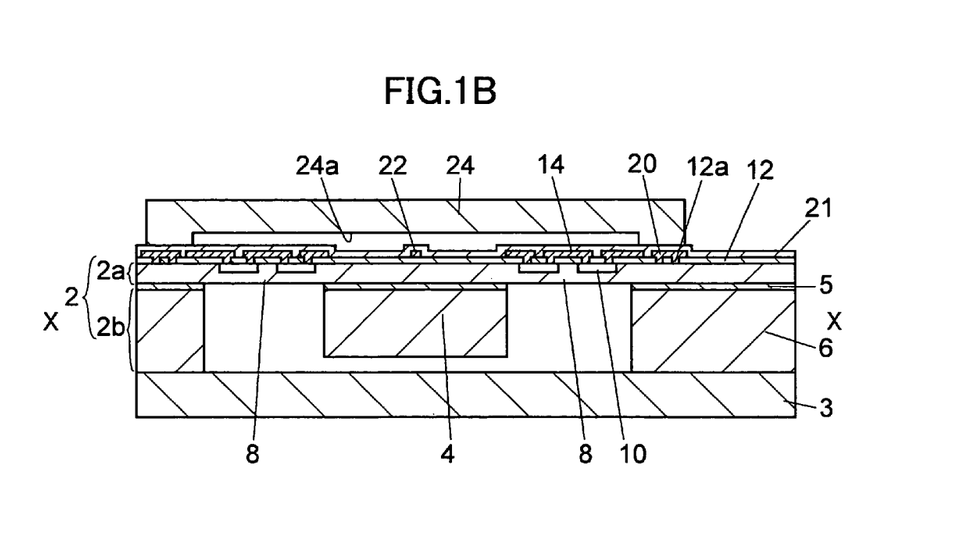
FIG. 1B is a cross-sectional view taken along line X-X of FIG. 1A.
Figure 1C:
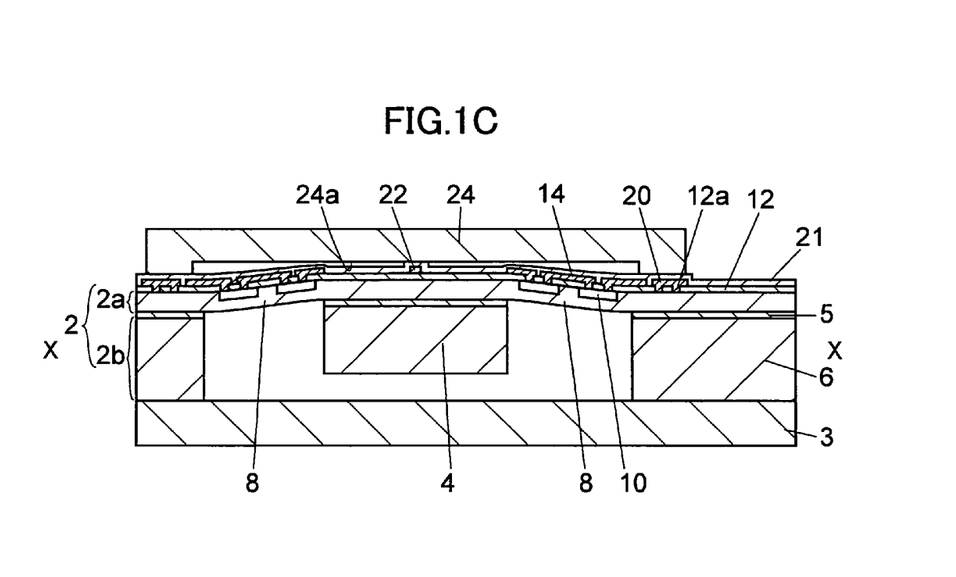
FIG. 1C is a cross-sectional view showing the semiconductor sensor during anodic bonding.

The following describes preferred embodiments of the present invention with reference to the accompanying drawings. FIG. 1A is a plan view showing a semiconductor sensor 1 according to an embodiment of the present invention. FIG. 1B is a cross-sectional view taken along line X-X of FIG. 1A. FIG. 1C is a cross-sectional view showing the semiconductor sensor 1 during anodic bonding.

The semiconductor sensor 1 comprises a SOI substrate 2 having a plane area of 2.0×2.5 mm and a thickness of 400 μm. The SOI (Silicon-on-Insulator) substrate 2 includes a silicon layer 2a at the upper surface side, an insulation layer 5 formed under the silicon layer 2a, and a silicon layer 2b formed under the insulation layer 5.

A proof-mass 4 that bends in response to acceleration is formed in the center part of the SOI substrate 2. The proof-mass 4 is formed of the silicon layer 2a, the insulation layer 5, and the silicon layer 2b. A frame-like frame 6 for supporting the proof-mass 4 is formed around and spaced apart from the proof-mass 4. The frame 6 is formed of the silicon layer 2a, the insulation layer 5, and the silicon layer 2b. Beams 8 are formed at the upper surface side of the SOI substrate 2. Each of the beams 8 has one end connected to the proof-mass 4 and the other end connected to the frame 6. The beams 8 are formed of the silicon layer 2a. Piezoresistors 10 whose resistances change with strain of the beams 8 are formed in the silicon layer 2a of the beams 8. The piezoresistors 10 are p-type diffused layers formed by introducing boron, which is a p-type impurity. A base 3 formed of a glass substrate is bonded to the lower surface of the SOI substrate 2 by anodic bonding in a spaced-apart relationship with the lower surface of the proof-mass 4.

The proof-mass 4, the frame 6, and the beams 8 are connected through the silicon layer 2a. Accordingly, the proof-mass 4 is supported by the frame 6 through the beams 8. The beams 8 therefore bend as the proof-mass 4 is displaced relative to the frame 6.

In this embodiment, the semiconductor sensor 1 includes one SOI substrate 2 at the initial step of the production process. The proof-mass 4, the frame 6, and the beams 8 are formed by deeply etching the SOI substrate 2 from the lower surface thereof. In the process of the deep etching for forming the proof-mass 4, the frame 6, and the beams 8, a resist pattern having openings in the positions corresponding to the area between the proof-mass 4 and the frame 6 and the areas of the beams 8 is formed on the lower surface of the SOI substrate 2, and is used as a mask for etching. In this process, the silicon layer 2b is etched to expose the insulation layer 5, which serves as an etching stopper layer. After removing the resist pattern, the exposed area of the insulation layer 5 is removed. Therefore, as shown in FIGS. 1B and 1C, the insulation layer 5 is not present under the silicon layer 2a of the beams 8. Then, in order to separate the proof-mass 4 from the frame 6, the exposed area of the silicon layer 2a is removed except the area where the beams 8 are to be formed.

It is to be noted that the present invention is not limited to this embodiment, and the insulation layer 5 may remain under the beams 8. Also, a non-SOI silicon substrate may be used in place of the SOI substrate 2.

An insulation film 12 formed of a NSG (non-doped silicon glass) film or a BPSG (boron phosphorous silicon glass) film having a thickness of, e.g., 0.8 μm is formed on the upper surface of the silicon layer 2a. Plural metal wiring patterns 14 made of aluminum and having a thickness of 1.0 μm and plural pad electrodes 16 are formed on the insulation film 12. The pad electrodes 16 are arranged in a line near one edge of the frame 6. The metal wiring patterns 14 have a line width of, e.g., 1.4 μm and are arranged at 1.5 μm pitch. The pad electrodes 16 each have a plane area of, e.g., 70×70 μm to 100× 100 μm.

Although the pad electrodes 16 shown in FIG. 1A have square shapes in plan view, the pad electrodes 16 may have other shapes such as, e.g., rectangular shapes and may have greater size for measuring electric properties.

Through holes 12a are formed in the insulation film 12 in the positions corresponding to the piezoresistors 10. The metal wiring patterns 14 are electrically connected to the piezoresistors 10 via the through holes 12a. In positions of the piezoresistors 10 corresponding to the through holes 12a, boron, which is a p-type impurity, is introduced in high concentration, so that contact resistance between the metal wiring patterns 14 is reduced.

A cover plate fixing area 18 surrounding the proof-mass 4 and the beams 8 is formed on the frame 6. Dummy patterns 20, which are formed at the same time as the metal wiring patterns 14, are formed in the cover plate fixing area 18. The dummy patterns 20 have line widths of, e.g., 1.4-130 μm and are arranged at, e.g., 1.4-2.0 μm pitches. In one embodiment, the dummy patterns 20 and the metal wiring pattern 14 formed at the same time in the cover plate fixing area 18 may be flush with the area.

The dummy patterns 20 are electrically connected to the silicon layer 2a forming the surface of the frame 6 via other through holes 12a formed in the insulation film 12. The dummy patterns 20 have the same electric potential as the silicon layer 2a. Since the dummy patterns 20 are electrically connected to the silicon layer 2a, the dummy patterns 20 can be bonded to a cover plate 24 (described below) by anodic bonding.

The cover plate 24 is disposed above and spaced apart from the proof-mass 4 and the beams 8. The cover plate 24 is bonded to the cover plate fixing area 18 by anodic bonding.

The cover plate 24 is made of, for example, Pyrex glass 7740 (Pyrex is a registered trademark of Corning Inc. (U.S.)) having a thickness of 200-300 μm. A gap 24a is formed by counterboring to 15 μm depth in an area of the cover plate 24 corresponding to the proof-mass 4 and the beams 8. The distance between the proof-mass 4 and the bottom surface of the gap 24a is in a range of, for example, 13 μm-17 μm under normal conditions, and is 15 μm in this embodiment.

Anodic bonding of the cover plate 24 is performed at a temperature of 420° C. or lower in order to reduce residual stress after bonding and thus prevent the proof-mass 4 and the beams 8 from being bent by stress that is not the stress of acceleration to be measured.

In performing anodic bonding, positive potential is applied to the N type silicon layer 2a, and negative potential is applied to the cover plate 24, to apply a direct electric field. The dummy patterns 20 have the same potential as the silicon layer 2a. Therefore, the dummy patterns 20 are bonded to the cover plate 24 where they contact each other. At this step, the metal wiring patterns 14 and the dummy patterns are electrically disconnected, and the bonded surface between the N type silicon layer 2a and the P type piezoresistors 10 has an opposite bias. Therefore, no electric current is applied to the P type piezoresistors 10 or the metal wiring patterns 14. Accordingly, even if the proof-mass 4 and the beams 8 are attracted to the cover plate 24 by the electrostatic force generated due to anodic bonding, the metal wiring patterns 14 formed on the beams 8 do not stick to the cover plate 24. Similarly, even if metal wiring patterns that are electrically connected to the P type piezoresistors 10 are formed on the proof-mass 4, the metal wiring patterns formed on the proof-mass 4 do not stick to the cover plate 24.

A projection 22 made of a metal material is provided on the insulation film 12 on the proof-mass 4. The projection 22 is made of the same material as and formed at the same time as the metal wiring patterns 14, the pad electrodes 16, and the dummy patterns 20. As there is no through hole in the insulation film 12 under the projection 22, the projection 22 is electrically independent.

Although not shown in FIG. 1A, an insulation film 21 as a final protection film is formed on the insulation film 12 so as to cover the metal wiring patterns 14, the dummy patterns 20, and the projection 22. The insulation film 21 has openings on the pad electrodes 16 so as to expose the surfaces of the pad electrodes 16. The area of the insulation film 21 on the projection 22 is raised relative to the area of the insulation film 21 around the projection 22 on the proof-mass 4.

Although the insulation film 21 is provided above the proof-mass 4, the frame 6, and the beams 8 in this embodiment, the insulation film 21 may be omitted.

In the following description, the proof-mass 4, the frame 6, the beams 8, and the projection 22 each include the insulation film 21. Accordingly, the expression "the proof-mass 4 sticks to the cover plate 24" indicates that "the insulation film 21 formed above the proof-mass 4 sticks to the cover plate 24", and the expression "the projection 22 is brought into contact with the cover plate 24" indicates that "the insulation film 21 formed above the projection 22 is brought into contact with the cover plate 24". However, the present invention is not limited to the configuration including the insulation film 21.

In the semiconductor sensor 1 of this embodiment, the metal wiring patterns 14 and the dummy patterns 20 are formed in the cover plate fixing area 18. The surface of the cover plate fixing area 18 is made flat by forming the dummy patterns 20 in the cover plate fixing area 18. Therefore, the contact area between the cover plate fixing area 18 and the cover plate 24 is increased, so that the cover plate 24 is fixed in a stable manner.

It is preferable that the dummy patterns 20 and the metal wiring pattern 14 be uniformly arranged around the proof-mass 4 and the beams 8. With this configuration, as the residual stress is uniformly applied to the frame 6 and the beams 8, the beams 8 are prevented from being irregularly bent while the semiconductor sensor 1 is not being used for measuring. Accordingly, changes in the initial resistance of the piezoresistors 10 are reduced, so that yield is improved.

Although the dummy patterns 20 have a shape like a band, the dummy patterns 20 may have a shape like a line. If the dummy patterns 20 have a shape like a band, since the area of the dummy patterns 20 serving as a bonding area is increased, the cover plate 24 is more firmly bonded.

In order to make the metal wiring patterns 14 and the dummy patterns 20 have a more symmetric shape, both band-shaped and line-shaped dummy patterns may be included.

In this embodiment, the cover plate 24 disposed above and spaced apart from the proof-mass 4 and the beams 8 limits upward displacement of the proof-mass 4. Accordingly, the beams 8 are prevented from being excessively bent, and therefore prevented from being damaged. Meanwhile, downward displacement of the proof-mass 4 is limited by the base 3. Since the cover plate 24 and the base 3 are fixed to the upper face and the lower face of the frame 6, respectively, the beams 8 are prevented from being damaged. Accordingly, the resistance of the semiconductor sensor 1 against impact is increased.

When anodic bonding is used for fixing the cover plate 24 to the frame 6, the proof-mass 4 held by the beams 8 is attracted to the cover plate 24 by electrostatic force produced by the anodic bonding as shown in FIG. 1C. The proof-mass 4 thus sticks to the cover plate 24, resulting in a defective product. However, in the semiconductor sensor 1 of this embodiment, since the projection 22 is provided on the proof-mass 4, the proof-mass 4 is prevented from sticking to the cover plate 24 even if the proof-mass 4 is attracted to the cover plate 24 by the electrostatic force due to anodic bonding. Even if the proof-mass 4 sticks to the cover plate 24, since the contact area between the proof-mass 4 and the cover plate 24 is smaller due to the presence of the projection 22 compared to a semiconductor sensor 1a not having the projection 22 (see, e.g., FIG. 7C), the proof-mass 4 can be easily separated from the cover plate 24.

It is preferable that the cover plate 24 be made of a glass that is transparent enough to see the proof-mass 4 and the beams 8 with human vision. If the cover plate 24 be made of such a glass transparent enough to see the proof-mass 4 and the beams 8, defects of the semiconductor sensor 1 such as water or foreign substances in the frame 6 and damages to the beams 8 can be easily detected with human vision.

Pyrex (™) glass having a linear expansion coefficient close to that of silicon is a preferable choice as the material of the cover plate 24.

In this embodiment, since the projection 22 is made of the same material as and formed at the same time as the metal wiring patterns 14 and the dummy patterns 20, there is no need to have a process only for forming the projection 22. Therefore, the production cost of the semiconductor sensor 1 can be reduced.

Since the projection 22 is electrically independent from the metal wiring patterns 14, the dummy patters 20, and the silicon layer 2a, even when the projection 22 is brought into contact with the cover plate 24 during anodic bonding, no electric current is applied from the silicon layer 2a to the cover plate 24 via the projection 22. Accordingly, the projection 22 is prevented from sticking to the cover plate 24.

Figure 2:
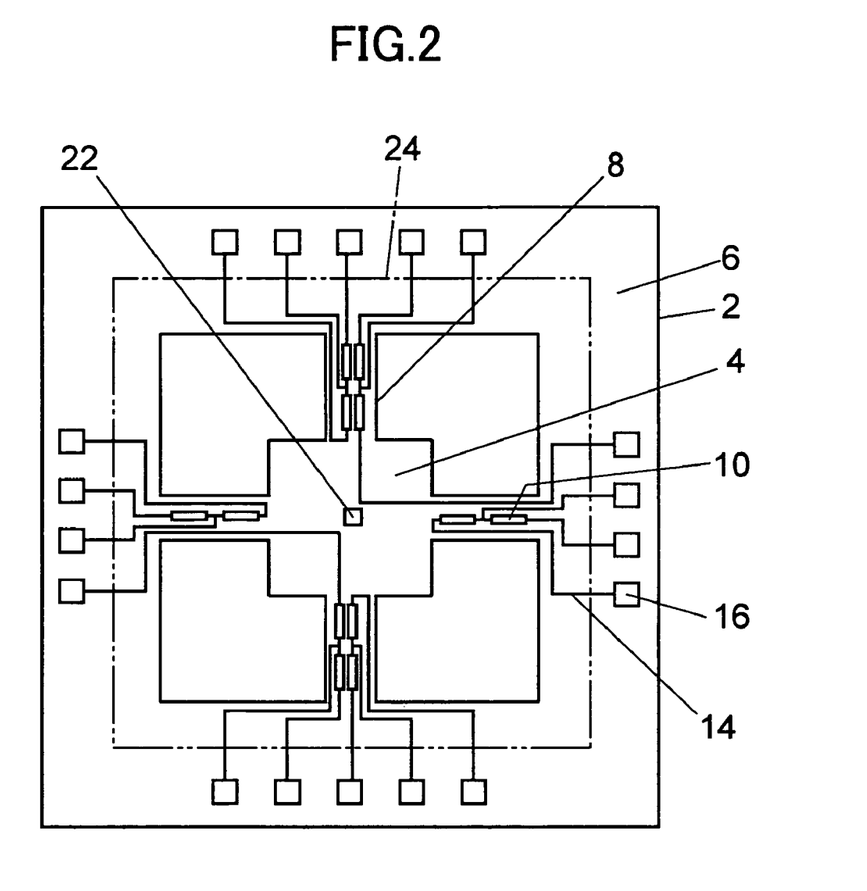
FIG. 2 is a plan view showing a semiconductor sensor according to another embodiment of the present invention.

Although the silicon layers 2a and 2b and the insulation layer 5 in the lateral side of the beams 8 are not removed in order to increase the volume of the proof-mass 4, the silicon layers 2a and 2b and the insulation layer 5 in the lateral side of the beams 8 may be removed as in an embodiment shown in FIG. 2.

It is to be noted that, in FIG. 2, an insulation film disposed on piezoresistors 10 is not shown in order to view the piezoresistors 10.

Although a semiconductor sensor of FIG. 2 does not include a dummy pattern on a frame 6, a dummy pattern may be formed at the same time as metal wiring patterns 14 so as to be, for example, uniformly arranged around a proof-mass 4. Although only one projection 22 is provided at the center part of the proof-mass 4 in the embodiment shown in FIG. 2, two or more projections 22 may be provided on the proof-mass 4.

In the semiconductor sensor shown in FIG. 2, since the projection 22 is positioned on the proof-mass 4, the projection 22 is brought into contact with a cover plate 24 when the proof-mass 4 is attracted to the cover plate 24 with electrostatic force due to anodic bonding. Accordingly, the proof-mass 4 is prevented from sticking to the cover plate 24. Even if the proof-mass 4 sticks to the cover plate 24, since the contact area between the proof-mass 4 and the cover plate 24 is smaller due to the presence of the projection 22 compared to a semiconductor sensor not having the projection 22, the proof-mass 4 can be easily separated from the cover plate 24.

In the above embodiments, although the projection 22 is formed at the same time as the metal wiring patterns 14, the projection 22 may be formed in a different process from that of the metal wiring patterns 20. Also, the projection 22 may be made of a non-metal material.

Figure 3A:
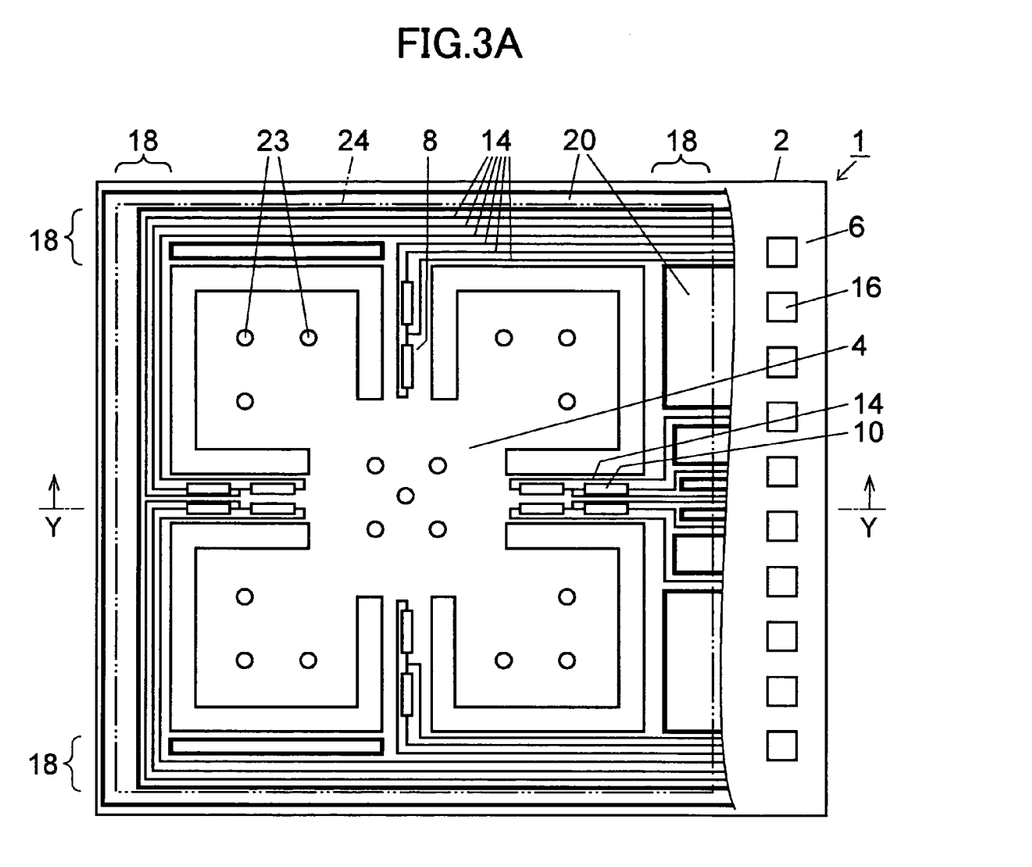
FIG. 3A is a plan view showing a semiconductor sensor according to still another embodiment of the present invention.
Figure 3B:
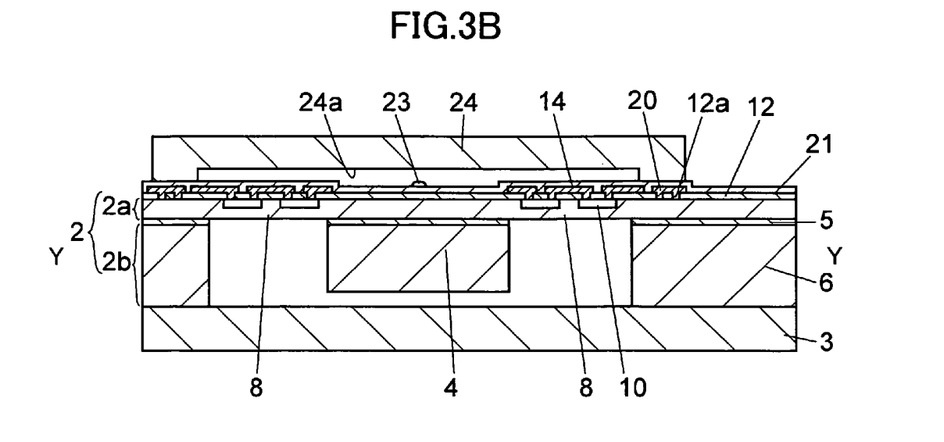
FIG. 3B is a cross-sectional view taken along line Y-Y of FIG. 3A.

In the above embodiments, although the projection 22 is formed under the insulation film 21, the present invention is not limited to this configuration. For example, as in an embodiment of FIGS. 3A-3C, the projection 22 may be replaced with a projection 23 formed on the insulation film 21. The projection 23 may be formed by, for example, potting insulating resin, although the material of the projection 23 is not limited to the insulating resin.

Figure 3C:
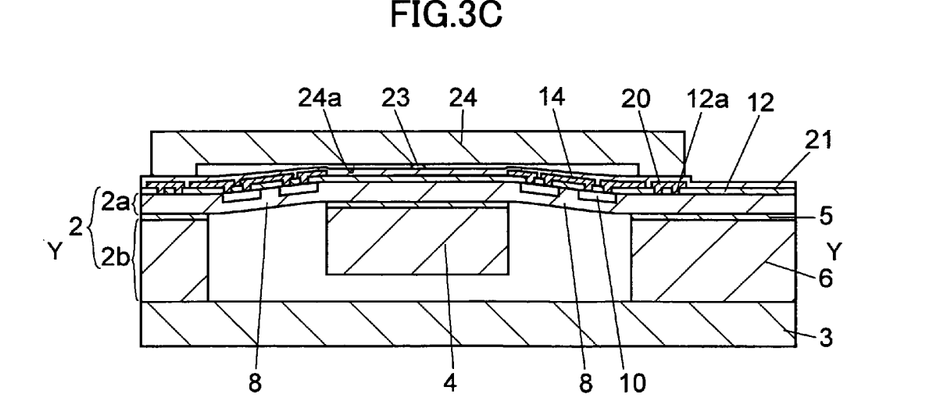
FIG. 3C is a cross-sectional view showing the semiconductor sensor during anodic bonding.

Even if the projection 23 made of a non-metal material is formed on the insulation film 21, when the proof-mass 4 is attracted to the cover plate 24 by electrostatic force due to anodic bonding, the projection 23 is brought into contact with the cover plate 24 and prevents the proof-mass 4 from sticking to the cover plate 24 as shown in FIG. 3C.

For example, in embodiment of FIGS. 1A-1C where a metal material area is not generally symmetric with respect to the longitudinal center of the beams 8, the beams 8 are distorted in their width directions with residual stress of the metal material. This might cause problems such as increase of the amount of correction to the initial value of the semiconductor sensor 1 in a static condition and loss of symmetry of multiaxial sensitivity. The static condition as used herein indicates that the semiconductor sensor remains static with the upper surface of thereof horizontally disposed. The multiaxial sensitivity indicates symmetry of detection sensitivity in one direction and detection sensitivity in the 180 degrees opposite direction. For example, the multiaxial sensitivity indicates symmetry of detection sensitivity in a Y-axis direction of a horizontally semiconductor sensor rotated clockwise by 90 degrees relative to an X axis and a detection sensitivity in the Y-axis direction of the horizontally disposed semiconductor sensor rotated counterclockwise by 90 degrees relative to the X axis.

Figure 4:
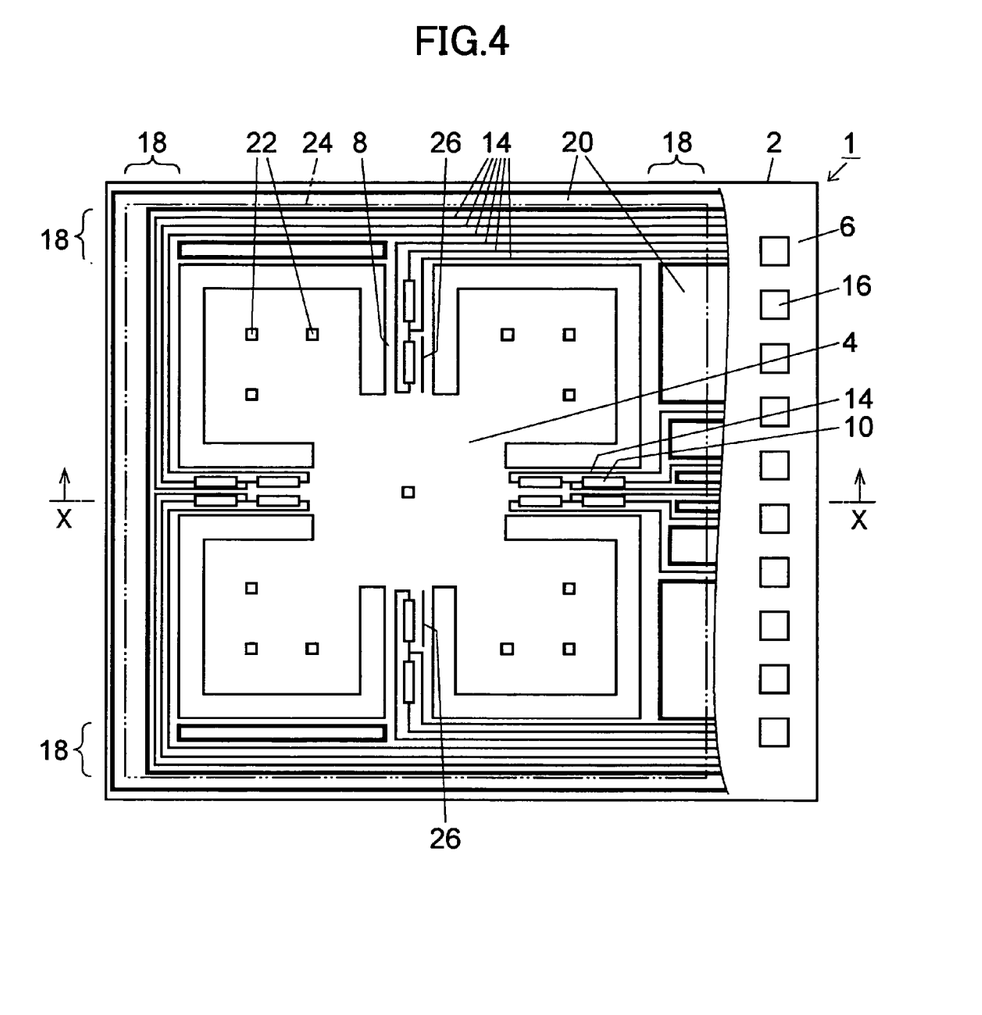
FIG. 4 is a plan view showing a semiconductor sensor according to a further embodiment of the present invention.

As in an embodiment shown in FIG. 4, second dummy patterns 26 may be formed on beams 8 so as to make the metal material area generally symmetric with respect to the longitudinal center line of the beams 8. The second dummy patterns 26 are formed at the same time as metal wiring patterns 14, and have the substantially same line width as the metal wiring patterns 14. The positions and the line width of the second dummy patterns 26 are determined so as to make the beams 8 have substantially the same strength relative to the longitudinal center line of the beams 8, thereby preventing width direction distortion of the beams 8 in the static condition.

Since the beams 8 have substantially the same strength relative to the longitudinal center line of the beams 8 to prevent width direction distortion of the beams 8 in the static condition, increase of the amount of correction to the initial value in the static condition and loss of multiaxial sensitivity are prevented. Therefore, detection accuracy is increased.

Moreover, the second dummy patterns 26 are electrically independent. Thus, even when a voltage is applied during anodic bonding, no electric current is applied to the second dummy patterns 26. Accordingly, the second dummy patterns 26 are prevented from sticking to the cover plate 24.

Figure 5A:
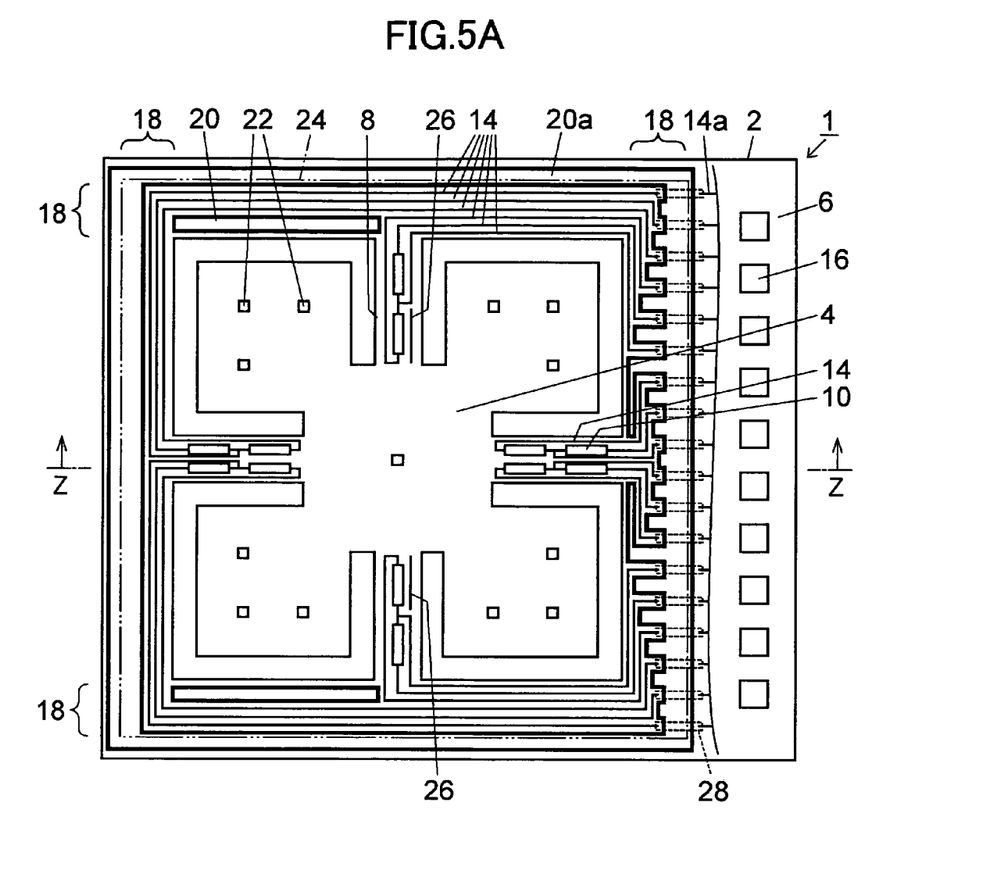
FIG. 5A is a plan view showing a semiconductor sensor according to further another embodiment of the present invention.
Figure 5B:
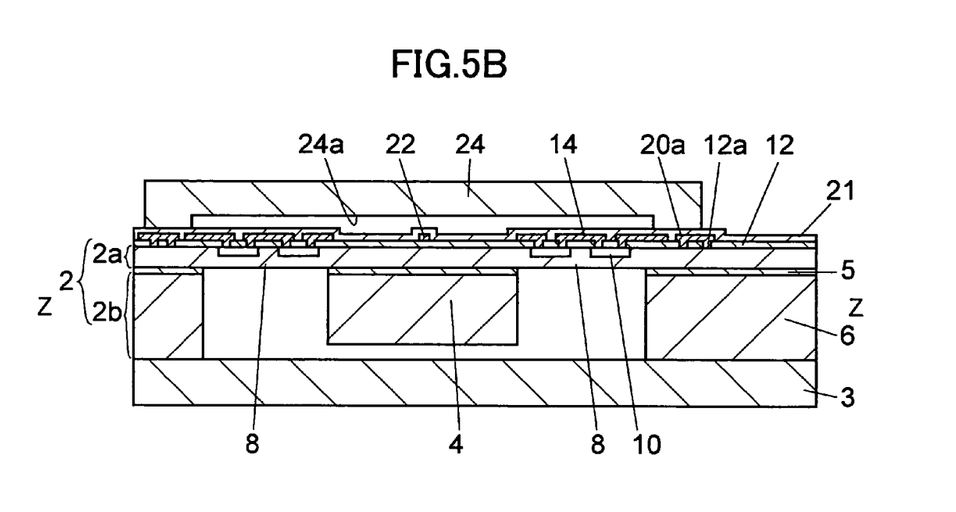
FIG. 5B is a cross-sectional view taken along line Z-Z of FIG. 5A.
Figure 5C:
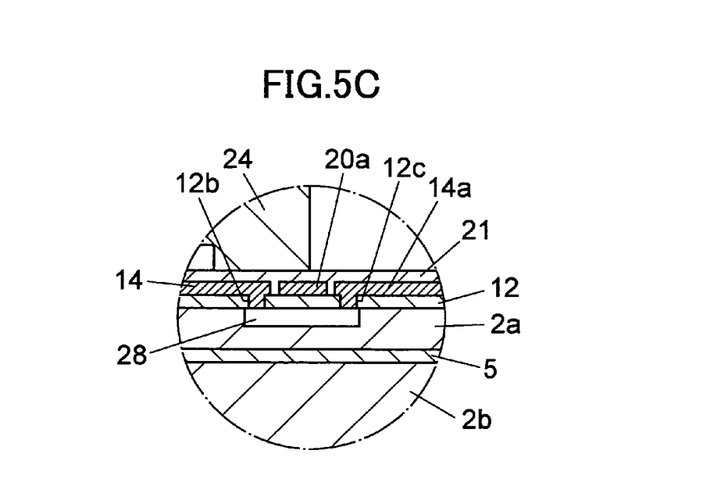
FIG. 5C is an expanded cross-sectional view showing the vicinity of an impurity diffused layer used as an interconnect.

FIG. 5A is a plan view showing another embodiment. FIG. 5B is a cross-sectional view taken along line Z-Z of FIG. 5A. FIG. 5C is an expanded cross-sectional view showing the vicinity of impurity diffused layers 28 used as interconnects. In FIGS. 5A-5C, elements corresponding to those in FIGS. 1A-1C and FIG. 4 are denoted by the same reference numbers, and are not further described.

In this embodiment, a dummy pattern 20a is formed in a cover plate fixing area 18 so as to surround a proof-mass 4 and beams 8. Impurity diffused layers 28 as interconnects for guiding electric potentials of the metal wiring patterns 14 to outside the area surrounded by the dummy pattern 20a are formed in predetermined regions of the silicon layer 2a under the dummy pattern 20a (see FIGS. 5A and 5C).

Through holes 12b are formed in an insulation film 12 on inner ends of the impurity diffused layers 28 inside the area surrounded by the dummy pattern 20a. The metal wiring patterns 14 are electrically connected to the inner ends of the impurity diffused layers 28 via the through holes 12b.

Through holes 12c are formed in the insulation film 12 on outer ends of the impurity diffused layers 28 outside the area surrounded by the dummy pattern 20a. Metal wiring patterns 14a are formed outside the area surrounded by the dummy pattern 20a, and are electrically connected at inner ends thereof to the outer ends of the impurity diffused layers 28 outside the area surrounded by the dummy pattern 20a. The other ends of the metal wiring patterns 14a are connected to pad electrodes 16.

The electric potentials of the metal wiring patterns 14 are guided to the metal wiring patterns 14a via the through holes 12b, the impurity diffused layers 28, and the through holes 12c.

The dummy pattern 20a is electrically connected via through holes 12a to the areas of the silicon layer 2a where impurity diffused layers 28 are not present.

In this embodiment, since the dummy pattern 20a is formed in the cover plate fixing area 18 so as to surround the proof-mass 4 and the beams 8, the area where the cover plate 24 is bonded to the insulation film 21 (the dummy pattern 20a) also surrounds the area where the proof-mass 4 and the beams 8 are formed.

Accordingly, when the semiconductor sensor is diced by wet dicing, penetration of water into the area where the proof-mass 4 and the insulation sections 8 are formed is prevented. Therefore, problems due to water penetration into the area where the proof-mass 4 and the insulation sections 8 are formed can be prevented.

The configuration of forming the dummy pattern 20a so as to surround the proof-mass 4 and the beams 8, and forming the impurity diffused layers 28 so as to guide the electric potentials of the metal wiring patterns 14 outside the area surrounded by the dummy pattern 20a, is applicable to any other embodiment according to the present invention.

Figure 6:
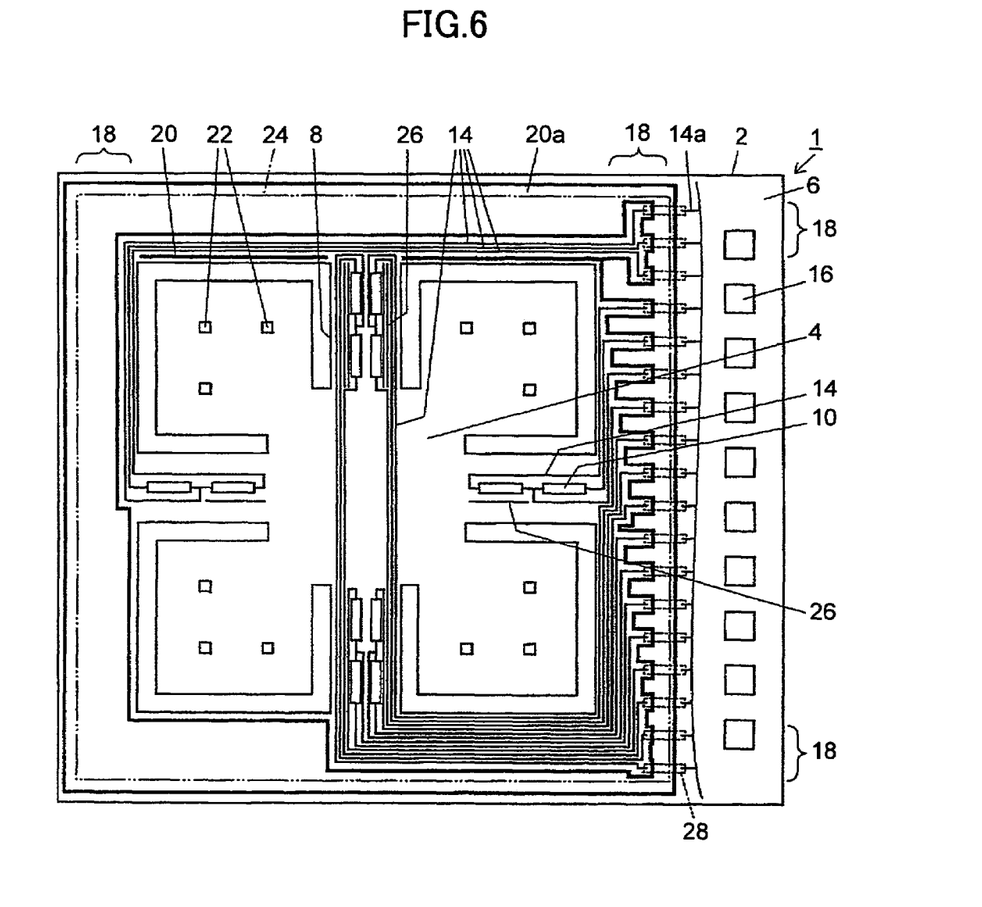
FIG. 6 is a plan view showing a semiconductor sensor according to a further embodiment of the present invention.

FIG. 6 is a plan view showing another embodiment. In FIG. 6, elements corresponding to those in FIGS. 1, 4, and 5 are denoted by the same reference numbers, and are not further described.

In this embodiment, similarly to the embodiments shown in FIGS. 4 and 5, the second dummy patterns 26 are formed on the beams 8 so that the metal material area is generally symmetric with respect to the longitudinal center of the beams 8. The second dummy patterns 26 are electrically independent.

Moreover, similarly to the embodiment shown in FIG. 5, the dummy pattern 20a is formed so as to surround the proof-mass 4 and the beams 8, and the impurity diffused layers 28 are formed so as to guide the electric potentials of the metal wiring patterns 14 outside the area surrounded by the dummy pattern 20a.

Furthermore, the metal wiring patterns 14, which are electrically connected to the piezoresistors 10, are formed on the proof-mass 4.

When bonding the dummy patterns 20 and 20a to the cover plate 24 by anodic bonding, positive potential is applied to the N type silicon layer 2a, and negative potential is applied to the cover plate 24, to apply a direct electric field. The dummy patterns 20 and 20a have the same potential have the same potential as the silicon layer 2a. Therefore, the dummy patterns 20 and 20a are bonded to the cover plate 24 where they contact each other. At this step, the metal wiring patterns 14 and the dummy patterns are electrically disconnected, and the bonded surface between the N type silicon layer 2a and the P type piezoresistors 10 has an opposite bias. Therefore, no electric current is applied to the P type piezoresistors 10 or the metal wiring patterns 14.

Accordingly, even if the proof-mass 4 and the beams 8 are attracted to the cover plate 24 by the electrostatic force generated due to anodic bonding, the metal wiring patterns 14 formed on the proof-mass 4 and the beams 8 do not stick to the cover plate 24.

Moreover, the second dummy patterns 26 are electrically independent, and are electrically disconnected with the dummy patterns 20 and 20a. Accordingly, even if the proof-mass 4 and the beams 8 are attracted to the cover plate 24 by the electrostatic force generated due to anodic bonding, the second dummy patterns 26 formed on the beams 8 do not stick to the cover plate 24.

In the embodiments shown in FIGS. 4 to 6, the second dummy patterns 26 are electrically independent; however, the second dummy patterns 26 can be connected to the metal wiring patterns 14. Even if the second dummy patterns 26 are connected to the metal wiring patterns 14, no electric current is applied to the metal wiring patterns 14 or the second dummy patterns 26. Accordingly, even if the proof-mass 4 and the beams 8 are attracted to the cover plate 24 by the electrostatic force generated due to anodic bonding, the second dummy patterns 26 formed on the beams 8 do not stick to the cover plate 24.

This configuration thus prevents the metal wiring patterns 14 from sticking to the cover plate 24, and also enhances the degree of freedom in the layout design of the metal wiring patterns 14.

While the present invention has been described in terms of the presently preferred embodiments, the size, shape, materials and arrangement of the components including the metal wiring patterns 14, the pad electrodes 16, the dummy patterns 20 and 20a are merely illustrative of the preferred embodiments. It will be apparent to those skilled in the art that variations and modifications may be made without departing from the scope of the invention.

The present application is based on Japanese Priority Application No. 2005-216998 filed on Jul. 27, 2005, with the Japanese Patent Office, the entire contents of which are hereby incorporated by reference.

What is claimed is:

1. A semiconductor sensor comprising:

a proof-mass;

a frame disposed around the proof-mass and including at least a silicon layer;

a beam for supporting the proof-mass, the beam being disposed at a first surface side, at a first surface, of the frame between the proof-mass and the frame;

a piezoresistor disposed on the beam;

a metal wiring pattern formed at least on the first surface of the frame and electrically connected to the piezoresistor;

a cover plate disposed above and spaced apart from the proof-mass and the beam at the first surface side of the frame and fixed to a cover plate fixing area disposed on the first surface of the frame;

an insulation film disposed on the proof-mass at the first surface side; and a projection disposed on said insulation film on the proof-mass at the first surface side to prevent the proof-mass from sticking to the cover plate, wherein the projection is made of the same metal material as the metal wiring pattern and is formed at the same time as the metal wiring pattern.

2. The semiconductor sensor as claimed in claim 1, wherein the cover plate is transparent enough to see the proof-mass and the beam from the first surface side with human vision.

3. The semiconductor sensor as claimed in claim 1, further comprising:

a dummy pattern formed in the cover plate fixing area at the same time as the metal wiring pattern.

4. The semiconductor sensor as claimed in claim 3, wherein the beam and the first surface of the frame include the same silicon layer;

the metal wiring pattern and the dummy pattern are formed on the silicon layer with an insulation film interposed between the metal wiring and the dummy pattern and the silicon layer; and the dummy pattern is electrically connected to the silicon layer via a through hole formed in the insulation layer.

5. The semiconductor sensor as claimed in claim 4, wherein the silicon layer is made of an N type silicon layer;

the piezoresistor is made of a P type diffused layer;

the metal wiring pattern and the dummy pattern are electrically disconnected; and the metal wiring pattern is also formed on the proof-mass.

6. The semiconductor sensor as claimed in claim 1, wherein the projection is electrically independent.

7. The semiconductor sensor as claimed in claim 1, wherein a distance between the proof-mass and the cover plate is in a range of 13 μm-17 μm.

8. The semiconductor sensor as claimed in claim 1, further comprising:

a dummy pattern, wherein the metal wiring pattern and the dummy pattern are formed on the beam such that a metal material area is generally symmetric with respect to a longitudinal center line of the beam.

9. The semiconductor sensor as claimed in claim 8, wherein the dummy pattern is electrically independent.

10. The semiconductor sensor as claimed in claim 8, wherein the dummy pattern is electrically connected to the metal wiring pattern.

11. The semiconductor sensor as claimed in claim 8, wherein the projection is electrically independent from the dummy pattern.

12. The semiconductor sensor as claimed in claim 1, wherein the projection is electrically independent from the metal wiring pattern.

13. The semiconductor sensor as claimed in claim 1, wherein the projection is electrically independent from the silicon layer.

* * * * *